Sept. 21, 1965
M. CLAR
3,207,344
SELF-LOADING VEHICLE
Original Filed Sept. 14, 1961
3 Sheets-Sheet 1
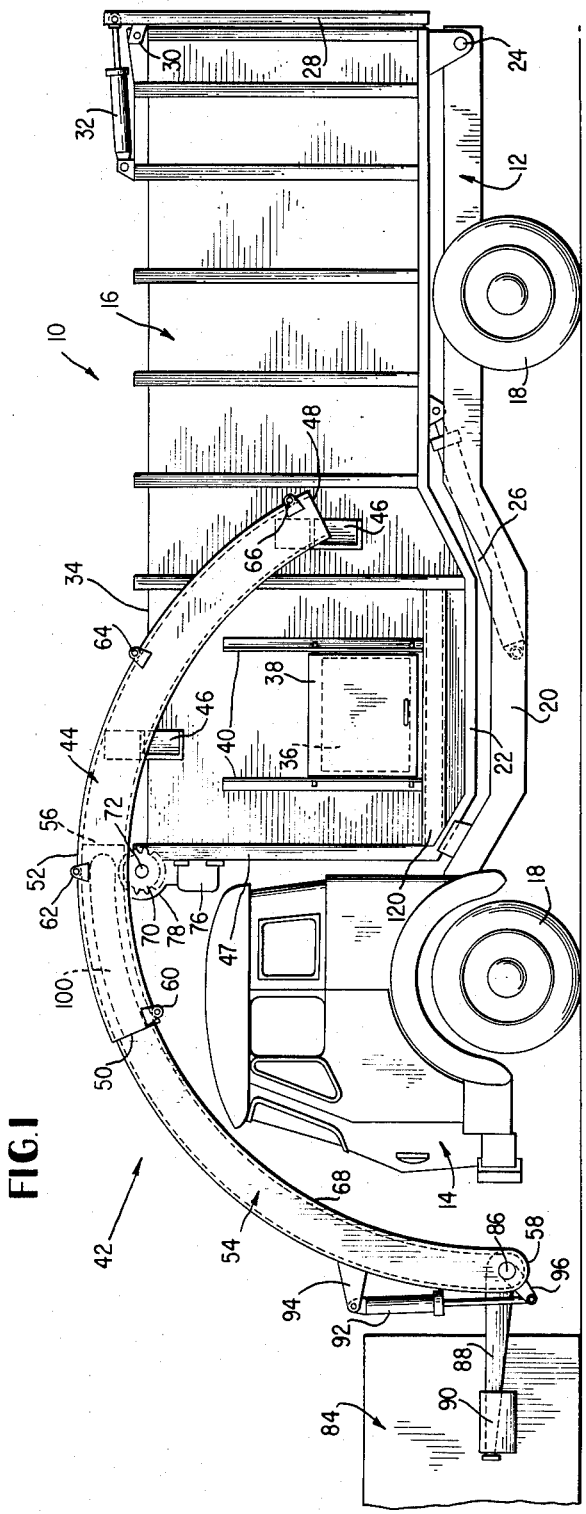
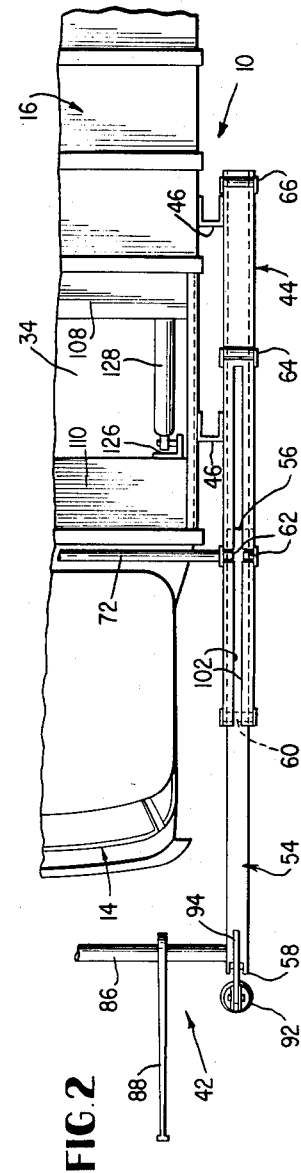
INVENTOR.
MILTON CLAR
BY
*Shapiro and Shapiro*
ATTORNEYS

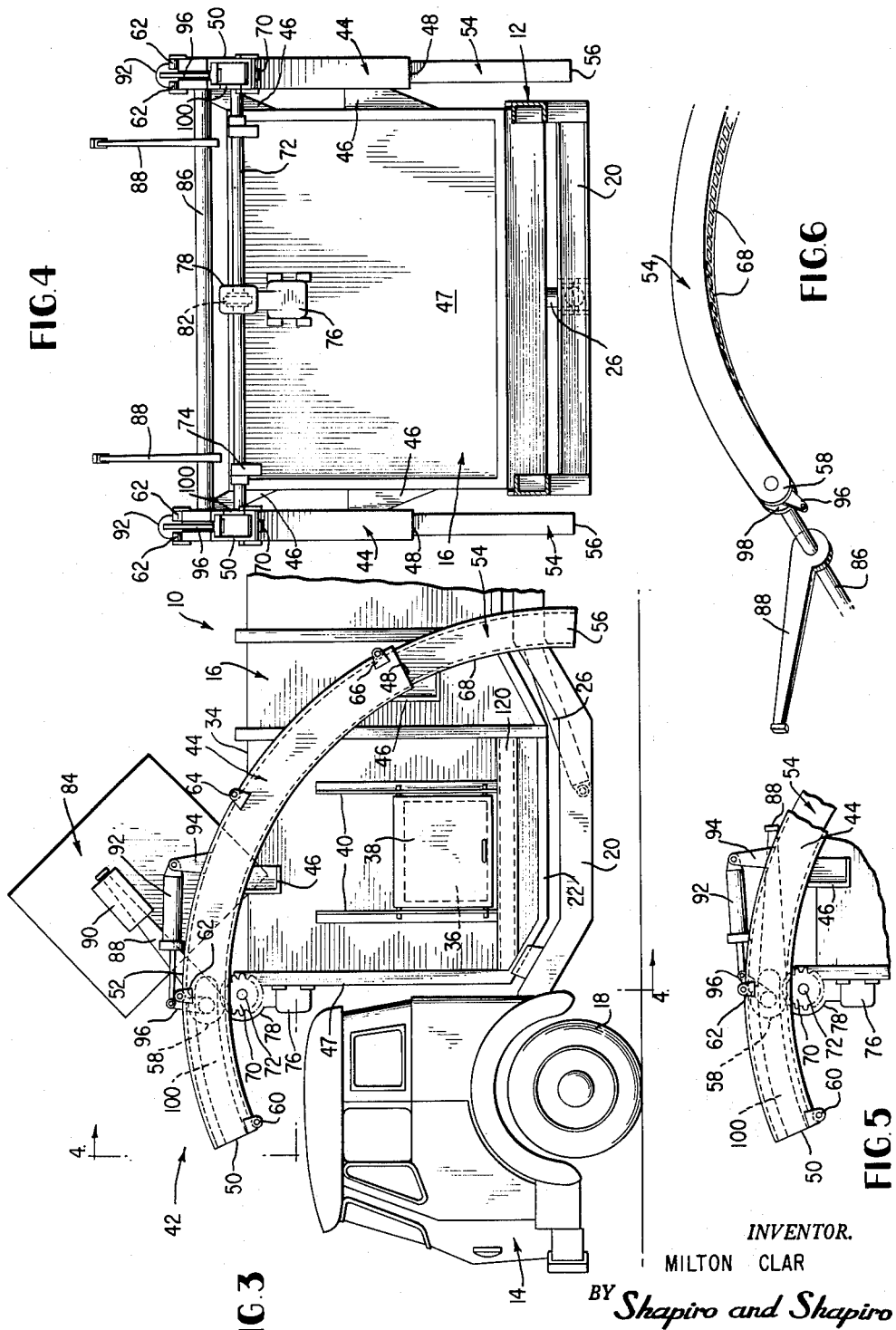

Sept. 21, 1965  M. CLAR  3,207,344
SELF-LOADING VEHICLE
Original Filed Sept. 14, 1961  3 Sheets-Sheet 3
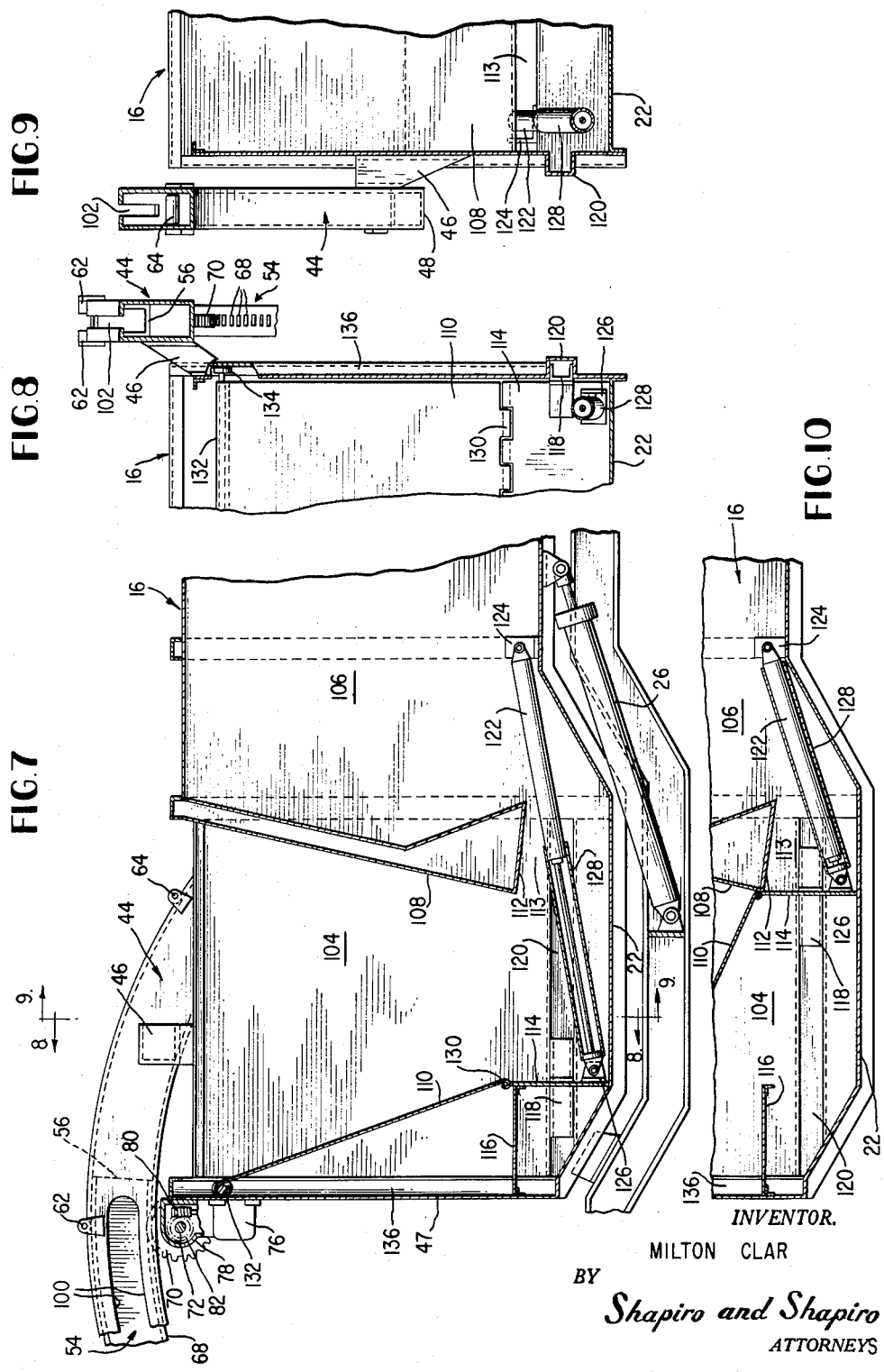
INVENTOR.
MILTON CLAR
BY
*Shapiro and Shapiro*
ATTORNEYS

United States Patent Office 3,207,344
Patented Sept. 21, 1965

3,207,344
SELF-LOADING VEHICLE
Milton Clar, Silver Spring, Md., assignor to Clar-Shayne, Washington, D.C., a partnership
Continuation of application Ser. No. 138,099, Sept. 14, 1961. This application Apr. 24, 1963, Ser. No. 276,128
16 Claims. (Cl. 214—302)

This invention relates to self-loading vehicles, and more particularly to improvements in vehicles, loading mechanisms, and vehicle bodies.

This application is a continuation of Serial No. 138,099, filed September 14, 1961, now abandoned.

In the refuse collection and other material handling industries trucks are employed which incorporate a mechanism for lifting a container and emptying the same into the truck body. The container may be permanently attached to the lifting mechanism, or may be separable therefrom so that the container may remain at a convenient site for filling. The lifting mechanism may be mounted at the front, side, or rear of the truck, the truck being designated accordingly as a front loader, side loader, or rear loader. The present invention has primary application to, but is not limited to, a front loader.

Front loaders currently in use employ a pair of elongated lifting members which are pivoted at one end on the truck chassis and which support or engage a container at the other end. The lifting members may be rigid or articulated and are located adjacent the opposite sides of the operator's cab. The lifting force is usually obtained from hydraulic rams which engage the respective lifting members. A mechanism of this type is required to lift a container and to move it rearwardly over the cab until the container reaches its destination above an access opening at the top of the truck body. Then the mechanism must invert the container, so that the contents are dumped into the truck body.

Various types of pivoted lifting arms have been proposed heretofore in an attempt to perform the foregoing functions in a manner which (1) provides good lifting efficiency, (2) prevents arm deformation under heavy loads, (3) minimizes clearance problems with respect to adjacent structures, (4) provides long operating life with minimum maintenance, and (5) maintains free access to the operator's cab regardless of the position of the arms. However, pivoted lifting arms have inherent characteristics which make the foregoing goals difficult to attain in practice. For example, pivoted lifting arms tend to be unstable in torsion under the influence of unbalanced loads. As a result, it is not uncommon for the lifting arms to become physically deformed under torsional stresses, particularly when the lifting mechanism is controlled by inexperienced or careless operators. Furthermore, excessive forces are often concentrated upon the pivots, resulting in premature wear and the need for frequent maintenance. Moreover, the lifting arms must have a long reach and/or peculiar configuration in order to accomplish their intended functions, introducing problems of clearance with respect to surrounding structures and of cab access.

It is accordingly a principal object of the present invention to provide a self-loading vehicle of unique construction and which overcomes or significantly alleviates the disadvantages of prior constructions.

A further object of the invention is to provide an improved front loading vehicle.

Another object of the invention is to provide improved lifting and dumping mechanism.

Still another object of the invention is to provide apparatus of the foregoing type which eliminates the pivoted lifting arms and the accompanying hydraulic lifting cylinders which characterize the prior art.

A further object of the invention is to provide a lifting mechanism of the foregoing type which utilizes a translatory, rather than a pivoting mode of operation.

An additional object of the invention is to provide an improved compaction body for use in the refuse collection and analogous field.

A still further object of the invention is to provide improved compaction apparatus.

Briefly stated, and without limitation, a front loading vehicle in accordance with the invention comprises a vehicle chassis with an operator's cab at the forward end and a body behind the cab. The body has an access opening at the top and may have additional access openings. The lifting and dumping mechanism comprises a pair of upwardly bowed parallel guide members arranged at opposite sides of the body and extending above the operator's cab. Lifting members of the same curvature telescope with the guide members and have elements which engage a container when the lifting members are extended, which lift the container as the lifting members are retracted, and which then dump the contents of the container into the access opening at the top of the body. In a preferred form, the body is divided into a forward compartment which receives the contents of the container and a rear compartment which stores the contents, a compaction mechanism being utilized to transfer the contents from one compartment to the other.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments, and wherein:

FIGURE 1 is a side elevation view of a front loading vehicle in accordance with the invention and illustrating the position of the lifting mechanism as it engages a container;

FIGURE 2 is a fragmentary plan view of the vehicle of FIGURE 1;

FIGURE 3 is a fragmentary side elevation view illustrating the position assumed by the lifting mechanism in the dumping of a container;

FIGURE 4 is a sectional view taken along line 4—4 of FIGURE 3 with the container omitted for clarity of illustration;

FIGURE 5 is a fragmentary side elevation view illustrating the rest position of part of the lifting mechanism of the invention;

FIGURE 6 is a fragmentary perspective view illustrating details of a lifting member and an associated container engaging element;

FIGURE 7 is a fragmentary vertical sectional view taken longitudinally of the vehicle of the invention and illustrating details of the body, compaction mechanism, and lifting member drive mechanism;

FIGURE 8 is a fragmentary sectional view taken along line 8—8 of FIGURE 7 and illustrating details of the lifting and compaction mechanisms;

FIGURE 9 is a fragmentary sectional view taken along line 9—9 of FIGURE 7 and illustrating details of the vehicle body and lifting mechanism; and FIGURE 10 is a fragmentary vertical sectional view similar to FIGURE 7 but illustrating the compaction mechanism in another position.

Referring to the drawings, and initially to FIGURE 1 thereof, the vehicle 10 of the invention has a chassis 12 with an operator's cab 14 at the forward end and a truck body 16 behind the cab. The chassis is supported on conventional wheels 18 and is propelled by the usual drive train including internal combustion engine, transmission, propeller shaft, differential, etc. As shown, the chassis is depressed or dropped at 20, and the body has a corresponding depressed or dropped bottom portion at 22. The body is composed of the usual frame and panel members defining a generally rectangular hollow shell with top, bottom, front, rear, and side walls. In the form shown the body is of the dump type, being mounted at 24 upon the rear end of the chassis for pivotal movement about a horizontal axis. A hydraulic ram 26 having its ends connected to the chassis and the bottom of the body, respectively, may be employed to tilt the body. The hydraulic ram is supplied from the usual central hydraulic system of the vehicle, which may include conventional pump, reservoir, control valves, and hydraulic lines. Expansion of the hydraulic ram 26 causes the body to turn about the pivotal mounting 24 so as to incline the body downwardly and rearwardly. This permits the material within the body to be expelled through a rear access opening normally closed by a door 28. The door may be pivotally mounted at 30 adjacent the top of the body and may be turned about its pivotal mounting by another hydraulic ram 32 operated from the same system as the ram 26. The body has a top access opening 34 at its forward end (see FIG. 2) which may be left open or which may be closed by a suitable door (not shown). In the form shown the body has one or more side access openings 36, which may be closed by suitable doors 38. In the illustrative form access opening 36 is at the left side of the body in the region above the depressed bottom 22, the door 38 being mounted for vertical sliding movement upon slotted track members 40 fixed to the body side wall.

The vehicle 10 has a self-loading mechanism generally designated by reference numeral 42. In the preferred embodiment of the invention this mechanism comprises a pair of arcuate, rigid, elongated guide members 44 of constant curvature. In the form shown the guide members are mounted upon the respective sides of the body by suitable bracing members 46 (see FIGS. 1 and 4). The guide members are parallel, upwardly bowed or upwardly convex circular arcs arranged in vertical planes. The center of curvature may lie approximately at axle level below the front wall 47 of the body. Preferably each guide member extends from a rear end 48 in the medial region of the body 16 to a forward end 50 in the region above the cab 14, the apogee 52 being located approximately above the front wall 47 of the body, and the rear end 48 being substantially lower than the forward end 50. Each guide member is preferably tubular and of rectangular cross-sectional configuration (see FIG. 9).

Each guide member 44 has associated therewith an arcuate, rigid, elongated lifting member 54 having the same constant curvature and the same center of curvature as the guide member. Each lifting member telescopes with its guide member, so that it may be moved in a translatory or sliding motion between a fully extended position as shown in FIGURE 1, and a fully retracted position as shown in FIGURE 3. In the retracted position the rear end 56 of the lifting member may project substantially from the rear end 48 of the guide member. In the extended position the forward end 58 of the lifting member is preferably located forwardly of the operator's cab 14 near the ground (approximately are axle level in the form shown). The lifting members 54 are also preferably tubular and of rectangular cross-sectional configuration, and the cross-sectional dimensions are slightly smaller than those of the guide members 44 to permit the lifting members to slide smoothly within the associated guide members, but with only sufficient clearance to permit such movement.

To facilitate the movement of the lifting members within the guide members suitable anti-friction bearings may be provided at 60, 62, 64, and 66. These bearings may comprise rollers which are mounted upon brackets fixed to the sides of the guide members and which protrude into the interior of the guide members through associated slots to engage the adjacent surfaces of the lifting members 54. As a general rule, the maximum stresses upon the lifting mechanism are exerted at the beginning of the lifting operation, when the lifting members 54 are fully extended. Bearings 60 at the bottom of the forward end 50 of the guide members receive the maximum downward load forces, and bearings 62 receive the reactive upward load forces due to the tendency of the load to attempt to turn the lifting members about the bearings 60 as fulcrums. In their fully extended position the lifting members should have a substantial portion within the guide members, as shown in FIGURE 1, so as to provide adequate support and balance for the portions which extend from the guide members.

In the preferred form of the invention, the lifting members 54 are driven by a rack and pinion principle. The lower surface of each of the lifting members is slotted as shown in FIGURE 6 to form the gear teeth of a rack 68. A vertical pinion 70 is located beneath the apogee of each guide member and protrudes through an associated slot in the lower surface of the guide member to engage the teeth of the corresponding rack. The pinions are fixed to the ends of a horizontal drive shaft 72, which rotates in bearings 74 fixed to the front wall 47 of the body as shown in FIGURE 4. Shaft 72 is driven by a source of motive power which preferably includes a conventional reversible rotary hydraulic motor 76 mounted upon the front wall of the body and driving a similarly mounted gear reduction unit 78. The hydraulic motor may be supplied from the central hydraulic system mentioned previously and preferably has a vertical output shaft which turns a worm gear 80 as shown in FIGURE 7. The worm gear turns a worm wheel 82 fixed to shaft 72. It is thus apparent that operation of motor 76 in one direction causes the shaft 72 and the pinions 70 to turn to extend the lifting members 54, and that operation of the motor 76 in the reverse direction drives the pinions 70 so as to retract the lifting members 54. The lifting members preferably have conventional limit-stop linkages connected to the control valve for the hydraulic motor 76 so as to limit the extension and retraction movements of the lifting members.

To perform their intended function, the lifting members must have some means for engaging a load. In the illustrative form shown the load comprises a separate container 84 (see FIGURES 1 and 3), although a different load such as a container permanently affixed to the lifting members may be utilized. Container 84 may be generally rectangular with a top access opening and may be mobile, as is well known. In the form shown the forward ends 58 of the lifting members are connected by a transverse shaft 86 (see FIGS. 2 and 6) having its ends rotatably mounted upon the lifting members in suitable bearings (not shown). A pair of container-engaging arms 88 is fixed to the shaft 86, one arm being located adjacent each of the lifting members 54. The arms are generally parallel and are spaced apart a distance somewhat greater than the width of the container 84 to be lifted so that the arms may lie adjacent the end walls of and embrace the container. In their normal load-engaging position the arms extend forward generally horizontally, so that they may enter sleeves 90 fixed to the ends of the container. The arms may have stops engaging the rear wall of the container to limit the insertion of the arms in the sleeves 90, or the arms may be capable of insertion until the rear wall engages the transverse shaft 86. The general use of the arms 88 and sleeves 90 is conventional in front loaders and needs no further description.

The orientation of the arms may be controlled by a pair of hydraulic rams 92, which are pivotally connected between brackets 94 fixed to the upper surface of the corresponding lifting members 54, and cranks 96 fixed to the ends of transverse shaft 86. As shown in FIGURE 6, the forward end 58 of the lifting members 54 may be slotted at 98 to permit turning movement of the cranks 96. The hydraulic rams 92 may be actuated from the central hydraulic system previously mentioned.

To permit the lifting members 54 to be retracted to the position shown in FIGURE 3, the inner side walls of the guide members 44 are slotted as shown at 100 in FIGURES 4 and 7 to provide for passage of the transverse shaft 86. Also, the upper wall of the guide members is slotted as shown at 102 in FIGURES 2, 8, and 9 to provide for passage of the brackets 94 and the cranks 96. Because of the slots 102, bearings 62 are formed in two parts.

The operation of the lifting mechanism 42 is clearly illustrated in FIGURES 1 and 3. The lifting members 54 are extended by operation of the motor 76, and with the arms 88 projected forwardly by the hydraulic rams 92, the vehicle 10 is moved toward the container 84 so as to insert the arms 88 in the sleeve 90 (see FIG. 1). Then the motor 76 is operated to retract the lifting members 54 and raise the container 84 to a position between the guide members 44 over the cab 14. Then hydraulic rams 92 are actuated to turn the arms 88 and invert the container 84 (see FIG. 3), so as to dump the contents of the container into the access opening 34 of the body. If desired, the rams 92 may be actuated during the lifting operation so as to maintain the container 84 more nearly upright until the time when inversion of the container is desired. After the container has been emptied, it is returned to its initial position by actuation of the hydraulic motor 76 and the rams 92. At this time the container may be disengaged from the arms 88 by rolling the container away from the truck or by backing the truck away from the container.

It will be observed that the movement of the lifting mechanism is an efficient translatory motion and that very little overhead clearance is required. In their retracted position the lifting members are unobtrusive, as shown in FIGURE 3, and the container engaging arms 88 may be turned by rams 92 to the position shown in FIGURE 5 in order to minimize arm protrusion during over-the-road travel. Torsional deformation of the lifting mechanism under the influence of unbalanced loads is strongly resisted by the box section of the guide members and the lifting members and by the maintenance of a substantial portion of the lifting members within the guide members. Full access to the operator's cab is maintained at all times.

In accordance with another aspect of the invention, the body 16 is divided into a forward, material-receiving compartment 104 and a rearward, material-storage compartment 106, as shown in FIG. 7. These compartments are separated by a transverse baffle wall 108 depending from the top wall of the body and extending between the side walls. The baffle wall 108 may be hollow, having a front surface which slopes downwardly and forwardly to form a hopper with another baffle wall 110 to be described hereinafter. The lower end 112 of wall 108 is spaced above the depressed bottom 22 of the body and is widened so as to form a passage 113 between compartments 104 and 106. The lower end 112 preferably slopes downwardly and rearwardly somewhat, so that the vertical dimension of the passage 113 decreases toward the rear to impart a taper to the passage.

A compaction blade 114 extends between the side walls of the body substantially upright from the bottom 22. The blade is mounted for reciprocation along the bottom 22 between a forward position at a horizontal stop member 116 (FIG. 7) and a rearward position at the baffle wall 108 (FIGURE 10). The compaction blade is preferably provided with side guide members 118 which slide in horizontal channels 120 formed in the side walls of the body. Movement of the compaction blade is accomplished by a pair of hydraulic rams 122 within the body adjacent the respective side walls and pivotally connected between brackets 124 on the bottom of the body and 126 on the blade 114. The hydraulic rams may be actuated from the central hydraulic system and are preferably provided with telescoping shrouds 128 which slide over the cylinders of the rams and protect the piston rods from material deposited in the body.

The previously mentioned baffle wall 110 is pivotally connected at 130 to the top of the compaction blade and extends forwardly and upwardly to a position adjacent the front wall 47 of the body. At this position the baffle wall is provided with a mechanism which permits the upper end of the wall to move vertically along the front wall of the body. This mechanism may comprise a shaft 132 held within a sleeve formed at the corresponding end of the baffle wall, the shaft ends supporting rollers 134 which move in vertical guide channels 136 fixed adjacent the front body wall as shown in FIGURES 7 and 8. Wall 110 is preferably a rigid panel which follows the compaction blade 114 as shown in FIGURES 7 and 10 to prevent the entrance of material between the compaction blade and the front body wall.

As the compaction blade moves toward the position shown in FIG. 10, the material in the path of the blade is forced through the passage 113 below the baffle wall 108 and is subjected to a preliminary compression by virtue of the taper of the passage. Then the blade moves back to the position of FIGURE 7. Each time the blade executes a stroke, additional material is pre-compacted and forced through the passage 113 from compartment 104 to compartment 106, where the material is stored for future disposal. The side access opening 36 shown in FIGURES 1 and 3 permits manual insertion of refuse and the like from cans and barrels, which may be emptied at a convenient level by virtue of the depressed bottom 22.

While preferred embodiments of the invention have been shown and described, it will be apparent to those skilled in the art that changes can be made in these embodiments without departing from the principles and spirit of the invention, the scope of which is defined in the appended claims. For example, while the worm gear drive of the invention, the scope of which is defined in the ap- the lifting mechanism in position and prevent "drift down," other types of drives could be employed. Accordingly, the foregoing embodiments are to be considered illustrative, rather than restrictive of the invention, and those modifications which come within the meaning and range of equivalency of the claims are to be include therein.

I claim:

1. A front loading vehicle, comprising a vehicle chassis having an operator's cab mounted at the front of the chassis and having a refuse type body mounted on the chassis behind the cab, said body having an access opening at the top, a loading mechanism including a pair of arcuate, elongated guide members mounted on the vehicle at the respective sides thereof and oriented to provide an upwardly convex curvature, a pair of arcuate lifting members supported for telescoping movement with respect to said guide members, respectively, between an extended position in which said lifting members extend forwardly and downwardly from said guide members and a retracted position, and load engaging means mounted upon said lifting members adjacent the forward end thereof.

2. The vehicle of claim 1, said load engaging means being movably mounted on said lifting members, said lifting members having means for moving said load engaging means between a load lifting position and a load dumping position.

3. The vehicle of claim 1, further comprising means mounted on said vehicle for driving said lifting members between their extended and retracted positions, said lifting members having gear racks, and said driving means having pinions engaging said gear racks.

4. A front loading vehicle having a chassis, an operator's cab at the front of the chassis, and a body behind the operator's cab, said body having an access opening at the top, a pair of upwardly bowed elongated guide members of constant curvature mounted at opposite sides of said vehicle and extending from locations approximately medial of the chassis to locations adjacent the operator's cab, a pair of elongated lifting members of the same curvature as and telescoping with said guide members, respectively, and extensible therefrom forwardly and downwardly, the forward ends of said lifting members having means for engaging a container, and means mounted on said vehicle for driving said lifting members between extended and retracted positions with respect to said guide members, whereby said container may be lifted to the vicinity of the access opening in said body.

5. The vehicle of claim 4, said driving means comprising means engaging the lower surfaces of said lifting members.

6. The vehicle of claim 4, said guide members being tubular and being mounted on the respective sides of the vehicle body.

7. The vehicle of claim 4, said guide means having anti-friction bearing elements engaging said lifting members.

8. The vehicle of claim 4, said lifting members having a transverse shaft connecting their forward ends.

9. The vehicle of claim 8, said container engaging means comprising elements mounted on said transverse shaft, said shaft being mounted for turning movement with respect to said lifting members, and means mounted on said lifting members for turning said shaft, whereby the orientation of said container may be changed from a lifting position to a dumping position.

10. The vehicle of claim 9, said container engaging means comprising a pair of spaced arms fixed to said shaft and extending forwardly therefrom in lifting position, and said shaft turning means comprising a hydraulic cylinder.

11. The vehicle of claim 9, said guide members having longitudinal slots extending from their forward ends to permit the passage of said shaft and said shaft turning means.

12. A front loading vehicle having a chassis, an operator's cab at the front of the chassis, and a body behind the operator's cab, said body having an access opening at the top adjacent the front wall of the body, a pair of upwardly bowed elongated guide members of constant curvature mounted at opposite sides of said body and extending in parallel vertical planes from locations approximately medial of the body to locations above the operator's cab, said guide members having their apogee near the top of the front wall of the body and having their center of curvature near the bottom of the front wall of the body, said guide members being tubular and of rectangular cross-section, a pair of elongated lifting members of the same curvature as and telescoping within said guide members, respectively, said lifting members also being tubular and of rectangular cross-section, said lifting members being movable in said guide members between an extended position in which the forward end of the lifting members is located in front of the operator's cab near ground level, and a retracted position in which the forward end of the lifting members is located above the operator's cab, said lifting members having a substantial portion thereof within said guide members when said lifting members are in said extended position, the forward end of said lifting members having container engaging means and having means for varying the orientation of said container engaging means between lifting and dumping positions, the lower surfaces of said lifting members having gear racks, and a pair of pinions rotatably mounted on said vehicle and engaging said gear racks, respectively, for driving them.

13. The vehicle of claim 12, said pinions being mounted upon the ends of a horizontal shaft rotatable upon said vehicle, and drive means for rotating said shaft.

14. The vehicle of claim 13, said drive means comprising a motor driving a worm gear, and said horizontal shaft having a worm wheel meshed with said worm gear.

15. The vehicle of claim 12, said guide members having anti-friction bearing means mounted thereon in engagement with said lifting members, said bearing means comprising bearing elements located at the bottom of the forward end of said guide members and bearing elements located at the top of said guide members intermediate their length.

16. A loading mechanism comprising a pair of substantially rigid, arcuate, elongated, substantially parallel, guide members having a forward end and a rearward end, said guide members being mounted in substantially vertical planes and oriented to provide an upwardly convex curvature, a pair of substantially rigid, arcuate, elongated, substantially parallel, lifting members supported for telescoping movement upon said guide members, respectively, between a retracted position and an extended position in which said lifting members extend forwardly and downwardly from the forward end of said guide members, load-engaging means mounted upon said lifting members adjacent to the forward end thereof, means for causing said lifting members to move from their extended position to their retracted position to lift a load, and means for thereupon causing said load-engaging means to release said load.

References Cited by the Examiner

UNITED STATES PATENTS

| | | | |
|---|---|---|---|
| 1,000,166 | 8/11 | Frayer | 214—135 |
| 1,214,976 | 2/17 | Vail | 214—303 |
| 1,526,621 | 2/25 | Zaun. | |
| 1,527,542 | 2/25 | Earhart | 254—97 X |
| 2,652,163 | 9/53 | Stickney | 214—518 |
| 2,831,590 | 4/58 | Greenfield et al. | 214—302 |
| 2,900,096 | 8/59 | Dempster et al. | 214—302 |
| 2,912,128 | 11/59 | Kamin | 214—82 |
| 2,934,226 | 4/60 | Dempster et al. | 214—82 |
| 3,016,157 | 1/62 | Brisson | 214—302 |

HUGO O. SCHULZ, *Primary Examiner.*

GERALD M. FORLENZA, *Examiner.*

UNITED STATES PATENT OFFICE
CERTIFICATE OF CORRECTION

Patent No. 3,207,344                                      September 21, 1965

Milton Clar

It is hereby certified that error appears in the above numbered patent requiring correction and that the said Letters Patent should read as corrected below.

Column 3, line 66, for "are" read -- at --; column 5, line 21, for "sleeve" read -- sleeves --, column 6, line 42, for ", the scope of which is defined in the ap-" read -- is highly preferred for its ability to "lock" --.

Signed and sealed this 19th day of April 1966.

(SEAL)
Attest:

ERNEST W. SWIDER
Attesting Officer

EDWARD J. BRENNER
Commissioner of Patents